US010727654B2

(12) United States Patent
Kiser et al.

(10) Patent No.: US 10,727,654 B2
(45) Date of Patent: Jul. 28, 2020

(54) METHOD AND DEVICE FOR STRIPPING A CABLE HAVING A MULTI-LAYERED SHEATH

(71) Applicant: KOMAX HOLDING AG, Dierikon (CH)

(72) Inventors: Markus Kiser, Büren (CH); Martin Stocker, Kussnacht (CH)

(73) Assignee: KOMAX HOLDING AG, Dierikon (CH)

( * ) Notice: Subject to any disclaimer, the term of this patent is extended or adjusted under 35 U.S.C. 154(b) by 342 days.

(21) Appl. No.: 15/785,521

(22) Filed: Oct. 17, 2017

(65) Prior Publication Data

US 2018/0109085 A1  Apr. 19, 2018

(30) Foreign Application Priority Data

Oct. 18, 2016 (EP) .................................... 16194464

(51) Int. Cl.
*H02G 1/12* (2006.01)

(52) U.S. Cl.
CPC ............ *H02G 1/128* (2013.01); *H02G 1/127* (2013.01); *H02G 1/1256* (2013.01); *H02G 1/1265* (2013.01)

(58) Field of Classification Search
CPC .... H02G 1/128; H02G 1/1256; H02G 1/1265; H02G 1/127
USPC ............ 219/121.68, 121.69, 121.71, 121.72, 219/121.73, 121.85
See application file for complete search history.

(56) References Cited

U.S. PATENT DOCUMENTS

| 5,142,121 A * | 8/1992 | Ezaki ................... H02G 1/128 |
| | | 219/121.85 |
| 5,414,931 A | 5/1995 | Wollermann |
| 6,370,759 B1 | 4/2002 | Shimizu |
| 2004/0182837 A1 | 9/2004 | Dietrich |
| 2010/0126665 A1 | 5/2010 | Cale et al. |
| 2015/0162729 A1 | 6/2015 | Reversat et al. |

FOREIGN PATENT DOCUMENTS

| CN | 103777277 A | 5/2014 |
| CN | 104113016 A | 10/2014 |
| CN | 205355698 U | 6/2016 |
| EP | 0389107 A1 | 9/1990 |
| EP | 1073163 A1 | 1/2001 |
| EP | 1447888 A1 | 8/2004 |
| EP | 1515410 A2 | 3/2005 |
| EP | 2887475 A1 | 6/2015 |
| FR | 2690015 A1 | 10/1993 |
| FR | 2728735 B1 | 2/1997 |
| IE | 102013008275 A1 | 11/2014 |

* cited by examiner

*Primary Examiner* — Phuong T Nguyen

(74) *Attorney, Agent, or Firm* — William J. Clemens; Shumaker, Loop & Kendrick, LLP

(57) ABSTRACT

In a method for stripping a cable having a multi-layered sheath, first, an initial layer of the sheath of the cable is cut in a stripping device using at least one stripping blade. This is followed by cutting an inner layer of the sheath located opposite the first layer using a laser beam of a laser cutting device. The stripping process is completed by removal of the sheath that was cut using the stripping blade and the laser beam.

10 Claims, 3 Drawing Sheets

(Prior Art)
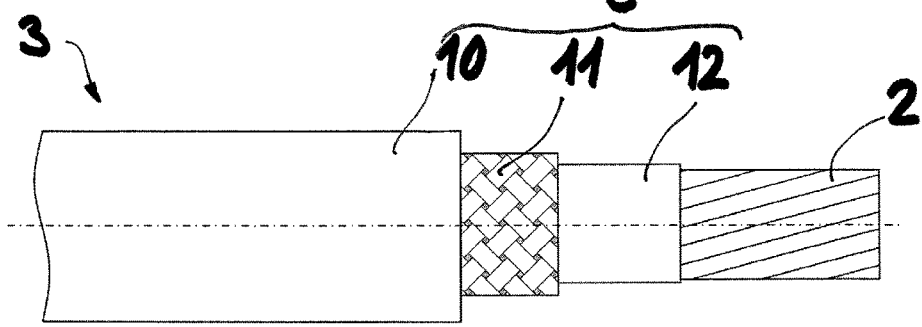
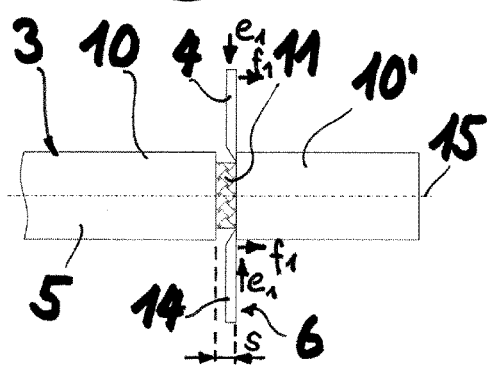
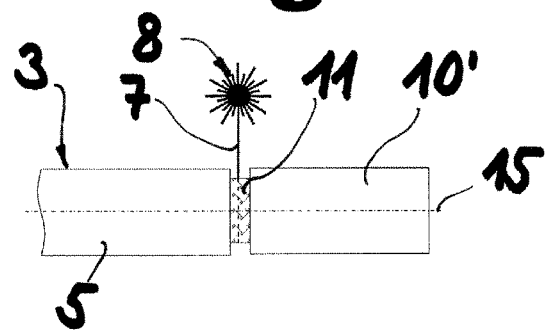
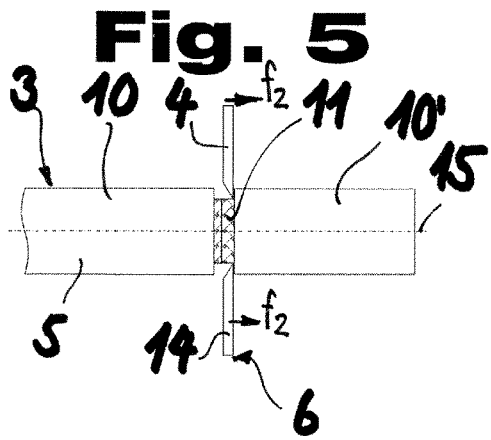
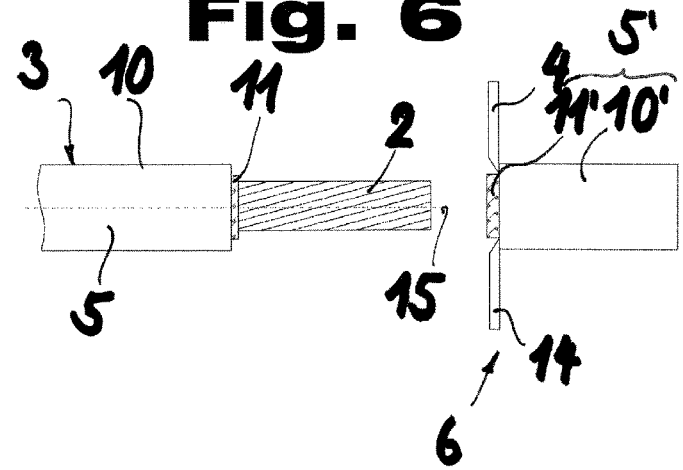

METHOD AND DEVICE FOR STRIPPING A CABLE HAVING A MULTI-LAYERED SHEATH

FIELD

The invention relates to a method and a device for stripping a cable having a multi-layered sheath.

BACKGROUND

Simple electrical cables include at least one conductor, for example, a wire, or one or more strands, as well as an insulating covering, for example of PVC. Cables of this sort are generally stripped in mechanically operating stripping devices containing stripping blades.

A more complex cable, whose sheath is constructed in multiple layers, is used for certain applications. A cable of this type having a multi-layered sheath is illustrated as an example in FIG. 2. The cable 3 has an electrical conductor 2 composed of a plurality of strands. The wires are covered, for example, in a plastic film 12. Film 12 can be designed as a screening film for creating a signal cable. Such screening films can be formed from plastic films coated with copper, aluminum or other metals. Common screening films have a thickness of approx. 0.03 mm. An additional layer 11 comprises glass cloth, for example. An outer shell 10 of PVC or another electrically insulating, elastic raw material is provided to protect cable 3. Practice has shown that cables having multi-layered sheaths are difficult to strip using mechanical processes. A clean cut of the glass cloth using stripping blades is almost impossible. Film 12, in particular, causes problems because unwanted damage to the strands can occur during separation by means of stripping blades.

A method for stripping a multi-layered cable is known from US 2015/162729, in which the cable is stripped using a laser. A laser beam rotates around a stationary cable in order to make a separating cut in the sheath. It is difficult, however, to adjust the laser so that it cuts through all layers of the sheath completely and cleanly with one cut. Alternately, a partial laser cut could be made and the sheath thus cut could be pulled off afterwards. In this case, however, unacceptable contamination remains on the strands, which must be removed in a costly subsequent step, for example using brushes.

SUMMARY

It is an object of the present invention to avoid the disadvantages of and to optimize and improve the known process for stripping cables having multi-layered sheaths.

The cable to be stripped can include a conductor (such as a wire or one or more strands made of copper or another electrically conductive metal) and a multi-layered sheath. The cable could, however, also be a composite cable, wherein the cable conductors are surrounded by a multi-layered sheath. The following procedure is suitable in particular for round cables. A composite, round cable is, for example, a cable, which is round in its cross-section that includes a sheath forming a circular ring and circularly arranged, twisted cable cores.

The method according to the invention for stripping a cable having a multi-layered sheath is characterized in that at least one layer of the cable sheath is at least partly separated or severed mechanically and at least another layer of the cable sheath is at least partly separated or severed in a thermal separation process. Cutting processes using blades or cutting edges can be preferably used for mechanical separation or severing of a layer. If, for example, stripping blades which are only moved translationally in the radial direction against the cable for the cut are used for the mechanical separation, it is generally almost impossible to fully cut through the respective layer of the sheath for the stripping. Although the commonly used stripping blades have a cutting geometry adapted to the cable (for example, V-blades, shaped blades), a not-separated region of the layer almost always remains after the separation process that is ultimately only removed during the removal process by tearing. An ideal separation cut distributed evenly around the circumference is almost impossible here. In contrast, by using one or a plurality of stripping blades rotating around the cable, the respective layer could be separated over the whole circumference, meaning not only partly. The previously mentioned thermal separation can take place using laser cutting, for example. A laser beam directed at the cable can be moved around the cable with reference to the cable axis, wherein after one rotation of less than 360° around the cable there would be only a partial separation of the respective layer or layers.

The method can include the following steps: Cutting a first layer of the sheath of the cable using a laser beam of a laser cutting device; cutting an inner layer of the sheath opposite the first layer in a stripping device having at least one stripping blade; and removal of the sheath cut by means of the stripping blade and the laser beam.

In a preferred variation, the stripping method according to the invention is characterized by the following steps:

In a step a), the first layer of the cable sheath is cut in a stripping direction using at least one stripping blade. In step a), the sheath is not completely, but only partly cut. The first layer mentioned is usually the outermost layer of the sheath, such as an outer coating of PVC or another plastic material for insulation and to protect the cable from the weather. The at least one stripping blade can be moved by translation against the cable to make the incision. A radial direction of movement against the cable is preferred for the cutting process. After the cutting process, the at least one stripping blade can be moved back into an initial position. The cutting takes place preferably until a second layer of the sheath is reached; the cutting depth of a respective stripping blade corresponds to approximately the thickness of the indicated first layer. The second layer mentioned does not necessarily have to be the layer following the outermost layer of the sheath (such as the already-mentioned outer coating). Using the at least one stripping blade, a plurality of layers could be cut together or sequentially in step a).

In a step b), an inner layer located opposite the first layer of the sheath is cut by means of a laser beam of a laser cutting device. The layer to be cut using the laser beam can, for example, be a fabric layer (such as fabric layer 11 according to FIG. 2). This inner layer located opposite the first layer is referred to as the "second layer" for the sake of simplicity. If a plurality of layers is cut together or sequentially in step a) using the at least one stripping blade, the "second layer" would then be the layer following the indicated plurality of "first layers".

For the cutting of the second layer, the laser beam directed in the direction of the cable can be guided around the cable in a radial direction while the cable is stationary. Instead of a rotational movement of the laser, it is also conceivable to hold a laser source that generates the laser beam stationary and to rotate the cable around its cable axis.

In a step c), the sheath cut by means of the stripping blades and laser beam are finally pulled off, which ends the stripping process. The removal according to step c) can be done using the aforementioned stripping device by displacing the at least one stripping blade in relation to the cable in the longitudinal direction. This relative motion for pulling off the sheath includes, for example, a displacement of the stripping blade or of the stripping blades in the case of a stationary cable, or a displacement of the cable in the case of a stationary stripping blade or stationary stripping blades. In any case, hybrid forms of the aforementioned movement models are also possible.

After removal of the sheath, the conductor is exposed or—in the event of a multi-core cable—the cable cores are exposed and can be processed further. For example, the stripped cable ends having the exposed conductors can be crimped. Thanks to the two-stage or possibly also multi-staged stripping process, in which mechanical stripping methods and laser stripping methods are advantageously combined, multi-layered cables can be stripped easily and efficiently with high-quality results. In this manner, good stripping results are achieved; costly post-processing of the cable ends, which can occur from incomplete cuts, for example, are not necessary.

If the cable sheath has more than two layers, it can be advantageous if at least one of steps a) or b) is repeated before the removal of the sheath in accordance with step c). For example, after cutting the first layer by means of the at least one stripping blade and after cutting the second layer by means of the laser beam, a third layer can be cut by means of a stripping knife. Alternately, the third layer could also be cut using the laser beam of the laser cutting device.

The third layer can, for example, be a film layer. This film can have a thickness that is less than 1 mm. If the cable is to be used as a signal cable, the cable must then be well shielded electromagnetically in order to ensure a high data transmission quality and so that electromagnetic waves emitted from the cable cannot cause unwanted interference, for example in vehicle on-board electronics. Screening films can be used to shield the cable. A screening film of this type often comprises a plastic film, for example of PET, onto which an aluminum layer has been applied. The thickness of common screening foils is approx. 0.3 mm. However, screening foils are also known that are completely made of a metal, such as copper or aluminum. These screening foils are known as all-metal foils.

It is advantageous if, after step a), the first layer, advantageously cut by means of the at least one stripping blade, is displaced in the longitudinal direction with reference to the cable in such a manner that a slit is created to expose the second layer is to be cut by the laser beam. This ensures that the laser cutting can be performed precisely and accurately.

Between the previously mentioned steps a) and b), the cable or the cable ends of the cables to be stripped can be transferred by means of a transfer device from the stripping device to the laser cutting device. The cable transfer can take place by, for example, displacing, pivoting and/or by a longitudinal movement of the cable.

Especially preferably, the cable can be returned to the stripping device by the transfer device after the end of step b) by a displacement in the longitudinal direction of the at least one stripping blade of the stripping device, the cut sheath, which was cut fully or only sectionally in layers, can be fully or partly pulled off. A slit is created by the partial removal of the cut sheath, into which the laser beam of the laser cutting device is introduced in order to cut an additional layer.

Another aspect of the invention relates to a device for stripping a cable having a multi-layered coating, in particular for performing the procedure previously described. The device according to the invention includes a stripping device having at least one stripping blade as well as a laser cutting device. The aforementioned stripping device having at least one stripping blade is a mechanically operating stripping device that will simply be referred to as "stripping device" in the following, for the sake of simplicity. One or more layers of the sheath can thus be selectively cut in the stripping device or in the laser cutting device.

The stripping device and the laser cutting device can be physically separated from each other. This physical separation can be achieved, for example, if the stripping device and the laser cutting device are assigned to separate cable processing machines that are not connected to each other, or if the stripping device and the laser cutting device are assigned to a common cable processing device (such as by arrangement on a common machine table), but the stripping device and the laser cutting device are arranged next to each other or are otherwise spaced apart from each other.

Especially in the latter case, it can be advantageous if the device has a transfer device, by means of which the cable can be transferred between the stripping device and the laser cutting device. It would also be conceivable to provide a special stripping station having a stripping device and a laser cutting device so that the cable does not have to be transferred between the individual stripping steps.

A swiveling unit having a gripping means for gripping the cable, for example, can also be used as a transfer device. Longitudinal conveyors such as belt or roller conveyors may also be used as transfer devices.

For a cable that includes an outer coating as the first layer, a fabric layer located beneath it as a second layer and a possible fabric layer or another reinforcement layer as the third layer, the outer coating is cut in the stripping device using the at least one stripping blade and later by means of a laser beam of the laser cutting device. Depending upon the cable sheath, it could also be necessary to cut first the first layer of the sheath by means of the laser beam and only then to use the mechanical stripping device having the at least one stripping blade to cut the second layer of the sheath. It would also be possible to implement the initially described method according to the invention using the device according to the invention in reverse order with respect to steps a) and b).

The device can have a control device, which is designed in such a manner and is connected to the stripping device and the laser cutting device in such a manner that, using the control device, the cutting process for cutting at least one layer of the cable sheath by means of the stripping device, as well as the cutting process for cutting at least a different or an additional layer of the sheath of the cable by means of the laser cutting device can be controlled. This arrangement causes a further increase in efficiency. The stripping of the cable having the multi-layer coating can be automated simply by means of the control unit.

The control device can preferably be connected to the transfer device, wherein the control device is designed to automatically feed the cable from the stripping device to the laser cutting device or from the laser cutting device to the stripping device after the end of a cutting procedure in the stripping device or in the laser cutting device.

DESCRIPTION OF THE DRAWINGS

Further individual features and advantages of the invention are derived from the following descriptions of exemplary embodiments and from the drawings. Shown are:

FIG. 2 is an enlarged side view of a cable having a three-layered sheath with a stripped cable end, FIG. 3 is a side view of a cable having a two-layered sheath with a first layer that has been cut by means of stripping blades and displaced to form a split, FIG. 4 shows the cable from FIG. 3 during the cutting of a second layer by means of a laser beam, FIG. 5 shows the cable after the laser cut of the second layer and with stripping blades retracted, FIG. 6 shows the fully stripped cable and a two-layered sheath separated by means of stripping blades.

DETAILED DESCRIPTION

Figure 1:
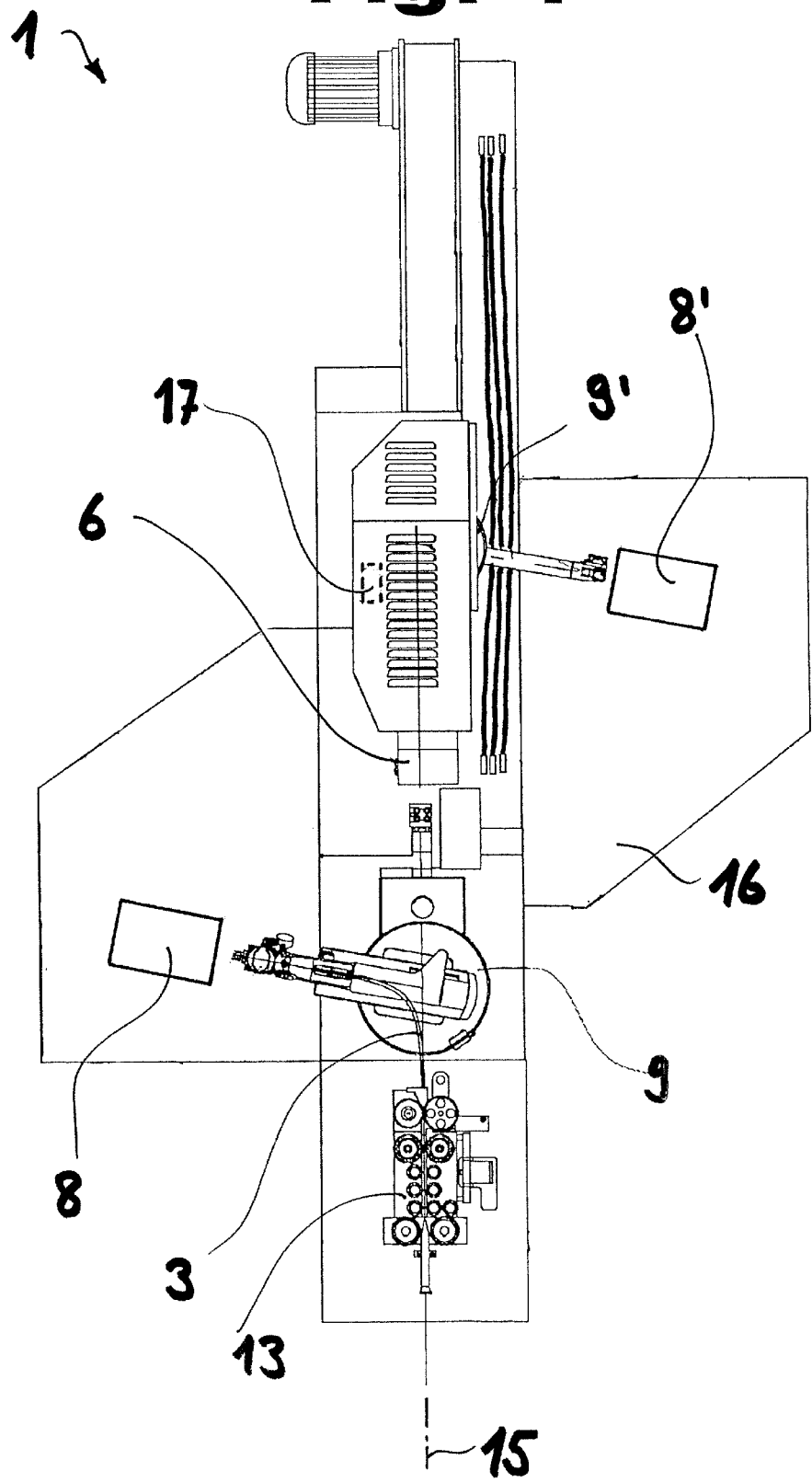
FIG. 1 is a top view of a device according to the invention for stripping a cable having a multi-layered sheath.

FIG. 1 shows a device generally designated as 1 for stripping multi-layered cables 3. Device 1 has a feed unit 13 designed as a belt conveyor, by means of which cable 3 is brought to a swivel unit 9 along a longitudinal direction indicated as 15, which essentially corresponds to the machine longitudinal axis of device 1. Swivel unit 9 has a gripping means to hold cable 3; using the gripping means, it is possible to bring the cable in the longitudinal direction 15 to the stripping device indicated as 6.

Stripping device 6 is a known stripping device for cutting cables to length and stripping them using stripping blades (not shown here). A stripping station of this type is illustrated and described, for example, in EP 1 515 410 A2; reference is made to this document regarding details on the function and constructive design of stripping device 6. The stripping blades can be designed as V-blades, which have V-shaped cutting edges. Such V-blades are also known from EP 1 515 410 A2. The stripping blades can alternately be designed as V-blades, such as are known from EP 389 107 A1. Clearly, blades having different cutting edges and cutting geometries are also conceivable. Stripping blades having opposed cutting edges, such as those disclosed in U.S. Pat. No. 6,370,759, are tried and tested for separating layers of fabric material, in particular of glass fiber-reinforced plastics or textile fabrics. Stripping blades of this type have the advantage that the two blades are less strongly pressed apart in the cable direction.

In contrast to stripping device 6, which is arranged in the machine longitudinal axis, a second stripping station indicated with 8 is arranged next to the machine longitudinal axis. This stripping station 8 is designed as a laser cutting device. The sheath of the cable can be at least partly cut by means of a laser beam. Details of one possible embodiment of such a laser cutting device 8 can be deduced from US 2015/162729, for example.

Swivel unit 9 can be turned around a vertical axis. In the illustration according to FIG. 1, swivel unit 9 is in a tilted-out position in front of the laser cutting device 8. Swivel unit 9 thus clearly forms a transfer device by which cable 3 can be transferred from stripping device 6 to laser cutting device 8 (and, of course, also back) in a swiveling motion. By means of the two stripping stations 6 and 8, the leading cable ends of cable 3 can be stripped as described in detail in the following manner. A second swivel unit 9' and a second laser cutting unit 8' are provided for stripping the trailing cable ends of cable 3, wherein the already mentioned stripping device 6 can also be employed for the trailing cable ends.

Stripping stations 6, 8, 8' are arranged in the exemplary embodiment according to FIG. 1 on a common machine table or platform 16. Machine table or machine platform 16 can be designed as one or more pieces. Device 1 is executed in the manner of an oscillating machine, such as is already known and in use in conventional cable processing devices for assembling cables (see, for example, EP 1 447 888 A1). Device 1 for stripping multi-layered cables 3 can be designed as a linear transfer machine, for example, in which all stripping stations (6, 8, 8') are arranged along one machine longitudinal axis (15). A linear transfer machine of this type is known from EP 1 073 163 A1, for example.

In FIG. 1, device 1 has only the indicated stripping stations 6, as well as 8 and 8'. It would also be conceivable to provide additional processing stations. Additional processing stations (not shown here) can be, for example, grommet stations, crimping stations and housing assembly stations.

Device 1 has a control device 17, which is connected to stripping device 6, laser cutting device 8 and swivel unit 9 as a transfer device. Control device 17 controls the respective cutting operations in stripping device 6 and laser cutting device 8. Control device 17 further controls transfer device 9 for the necessary transfer of the cable between the stripping device and the laser cutting device.

FIG. 2 shows a typical multi-layered cable 3 as is commonly used. Cable 3 encompassing one conductor 2 has a multi-layered sheath 5, which is composed of three layers here. The outer layer or layer 10 as seen from outside is an outer coating 10. This outer coating 10 can be made from PVC or another flexible plastic material and serves to insulate and protect the cable from the weather. The following, second layer, meaning the layer that lies inside, opposite first layer 10, is a fabric layer 11 or another reinforcement layer, which can be a glass cloth, for example. Finally, the third layer is formed of a thin film 12, which can consist of a plastic material. Film 12 can be designed as a screening foil. Conductor 2 here comprises a plurality of strands, which are usually made of copper or aluminum.

Individual method steps of a method according to the invention for stripping a cable 3 having a two-layered sheath 5 are illustrated in FIGS. 3 to 6. Sheath 5 of cable 3 basically corresponds to the coating structure of the cable from FIG. 2; in contrast to the cable illustrated in FIG. 2, this cable 3 lacks film (12).

The corresponding stripping method for stripping cable 3 having the two-layered sheath 5 is as follows: Cable 3 is first cut by two stripping blades 4 and 14 of a stripping device that can be moved toward each other. The respective cut depths are adjusted in such a manner that they correspond to the thickness of outer coating 10. The cutting occurs until it reaches the second layer, which is formed by fabric layer 11. The movement directions for the cutting process are each indicated with arrows $e_1$. After cutting, stripping blades 4, 14 are displaced in longitudinal direction 15 with respect to cable 3. The displacement motion is indicated with arrows $f_1$. The displacement can be executed by moving stripping blades 4, 14 and/or by moving cable 3 (by means of the gripping means of swivel unit 9 indicated in FIG. 1). The coating portion partly pulled off of outer coating 10 is indicated with 10'.

A slit is created by means of this displacement, wherein second layer 11 is exposed by approximately the slit width s. The creation of the slit having slit width s permits the application of a laser beam for cutting second layer 11. Slit width s is dependent upon the cable to be processed and its dimensions and is typically 0.1 mm to 1 mm.

After cutting outer coating 10 and the limited displacement of this cut layer or of coating portion 10' in the stripping device, cable 3 can be brought to a laser cutting device 8 by means of a transfer device (not shown here). Control device (17) mentioned in connection with FIG. 1 is preferably designed to automatically feed cable 3 from stripping device 6 into laser cutting device 8 after the end of the cutting procedure.

The laser-cutting process is illustrated in FIG. 4. A laser beam 7 is directed against cable 3 in a radial direction by means of laser cutting device 8. By rotating the cable or by a rotation of the beam source for producing laser beam 7 around cable 3, a circumferential cut is created, by means of which fabric layer 11 is completely severed.

After cutting second layer 11 by means of the laser beam, stripping blades 4, 14 are again used. Stripping blades 4, 14 are positioned within the split between the outer coatings 10, 10' that are at a distance s apart from each other. FIG. 5 shows stripping device 6 having stripping blades 4, 14 positioned in such a manner. By the displacement of stripping blades 4, 14 in the direction $f_2$, the fully cut sheath 10' can be pulled off of conductor 2. The fully stripped end of cable 3 is shown in FIG. 6. The separated sleeve portion of the sheath indicated with 5' is removed from the cable 3 by moving stripping blades 4, 14. Sleeve portion 5' comprises the separated coating portion 10' and the separated portion 11' of the second layer.

Figure 7:
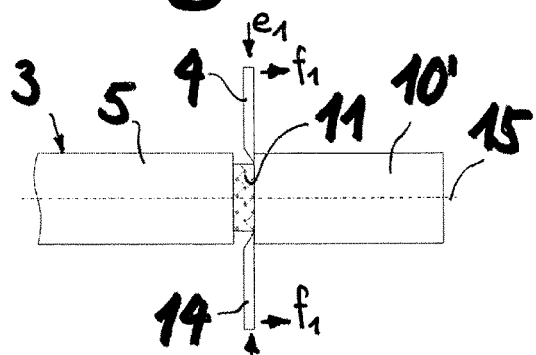
FIG. 7 is a side view of a cable having a three-layered sheath with the first layer cut by means of stripping blades and displaced to form a split for exposing a second layer.
Figure 8:
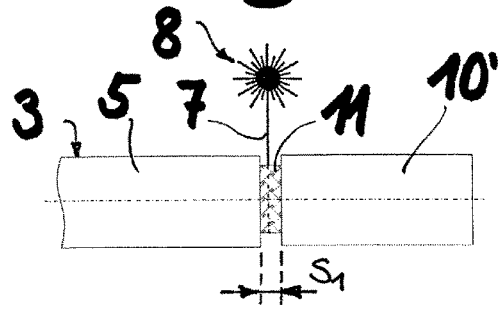
FIG. 8 shows the cable according to FIG. 7 during the cutting of a second layer by means of a laser beam.
Figure 9:
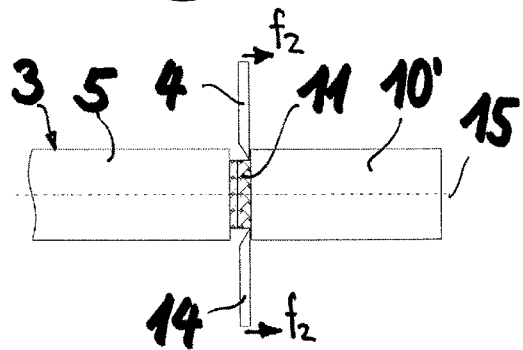
FIG. 9 shows the cable after the laser cutting of the second layer and with retracted stripping blades.

FIGS. 7 to 13 show a method for stripping a cable 3 having a three-layered sheath 5, which is constructed in the same way as the cable in FIG. 2. FIGS. 7 to 9 essentially correspond to FIGS. 3 to 5. Cable 3 is first partly cut by means of stripping blades 4, 14 (FIG. 7) and then partly withdrawn to about a slit width $s_1$ (FIG. 8), then second layer 11 is cut by means of laser beam 7 (FIG. 8) and stripping blades 4, 14 are then repositioned in the slit (FIG. 9).

Figure 10:
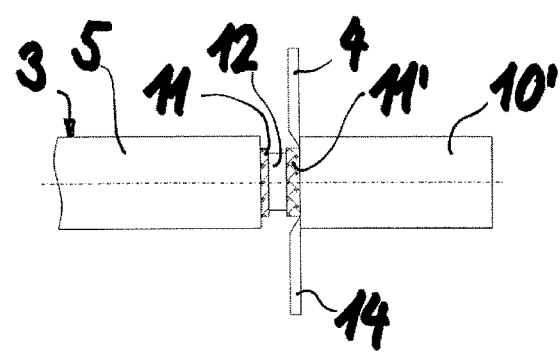
FIG. 10 shows the cable after the displacement of the second layer to form a split for exposing a third layer.
Figure 11:
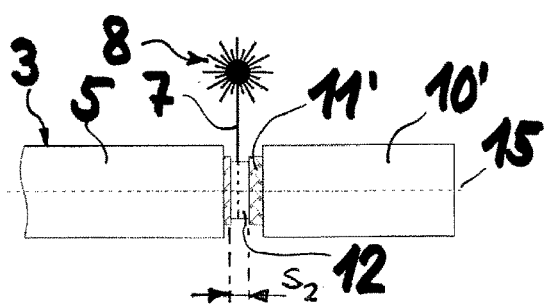
FIG. 11 shows the cable according to FIG. 10 during the cutting of the third layer by means of a laser beam.

Stripping blades 4, 14 are now moved a small distance—in contrast to the stripping process according to FIGS. 3 to 6—in the direction of longitudinal direction 15 (arrows $f_2$). In this manner, a slit is created around which the third layer 12 is exposed. FIG. 10 shows cable 3 after this displacement movement. The slit width, around which third layer 12 is exposed is indicated in FIG. 11 with $s_2$.

Figure 12:
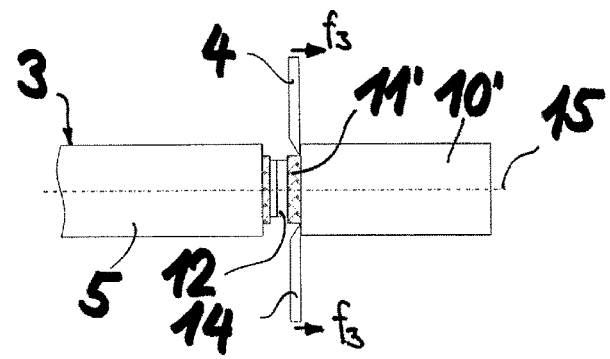
FIG. 12 shows the cable after the laser cutting of the third player and with retracted stripping blades.
Figure 13:
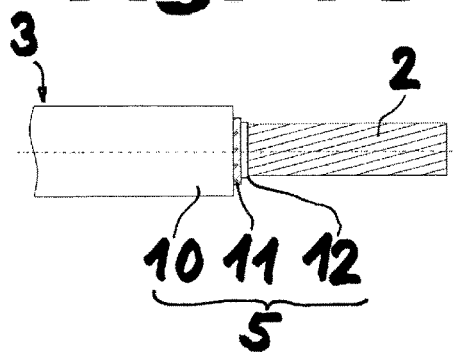
FIG. 13 shows the fully stripped cable and a three-layered sheath separated using stripping blades.

The laser cutting device can now be used again. Laser beam 7 is moved in a rotational movement around cable 3 and film 12 is thus fully separated (FIG. 11). After cutting third layer 12 by means of the laser beam, stripping blades 4, 14 are positioned in such a manner that they laterally grip the shoulder of the coating 10' separated by means of the stripping blades (FIG. 12). As a result of the displacement of stripping blades 4, 14 in the $f_3$ direction, the sheath can be completely pulled off. As shown in FIG. 13, sleeve portion 5' clearly comprises three layers, namely coating portion 10', portion 11' of the second layer, and a separated film portion that is indicated with 12'.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for stripping a cable having a multi-layered sheath comprising the steps of:
    at least partly mechanically separating at least one layer of the sheath of the cable; and
    at least partly separating another layer of the sheath of the cable by a thermal separation process;
    performing the mechanically separating step using at least one stripping blade of a stripping device and performing the thermal separation process step using a laser beam of a laser cutting device;
    the method for stripping a cable further comprising:
        a) cutting a first layer of the sheath by performing one of the mechanically separating step and the thermal separation process step;
        b) cutting an inner layer of the sheath located opposite the first layer by performing another one of the mechanically separating step and the thermal separation step; and
        c) removing from the cable a portion of the sheath cut by the at least one stripping blade and the laser beam.

2. The method for stripping a cable according to claim 1 including repeating at least one of the mechanically separating step and the thermal separation step before performing the step c).

3. The method according to claim 1 including, after the step a) is performed, displacing a cut portion of the first layer to form a split exposing the inner layer to be cut.

4. The method according to claim 1 including between performing the steps a) and b), transferring the cable from the stripping device to the laser cutting device using a transfer device.

5. The method according to claim 4 including after the step b) is performed, returning the cable to the stripping device using the transfer device and moving the least one stripping blade of the stripping device to partly or fully remove the portion of the sheath.

6. The method according to claim 5 including forming a slit by the partly removing the portion of the sheath, and introducing into the slit the laser beam of the laser cutting device to cut an additional layer of the sheath.

7. A device for stripping a cable having a multi-layered sheath comprising:
    a stripping device with at least one stripping blade; and
    a laser cutting device wherein the stripping device and the laser cutting device are each positioned for selectively cutting different layers of the sheath by performing the method according to claim 1.

8. The device according to claim 7 including a control device connected to the stripping device and to the laser cutting device for controlling the stripping device to cut at least one layer of the sheath and for controlling the laser cutting device to cut at least another layer of the sheath.

9. The device according to claim 7 including a transfer device for transferring the cable between the stripping device and the laser cutting device.

10. The device according to claim 9 wherein the control device automatically feeds the cable from the stripping device to the laser cutting device after the cutting of the at least one layer or feeds the cable from the laser cutting device to the stripping device after the cutting of the at least another layer.

* * * * *